United States Patent [19]
Kepley, Jr. et al.

[11] Patent Number: 5,999,232
[45] Date of Patent: *Dec. 7, 1999

[54] PIVOTING MOUNT FOR A REAR PROJECTION VIDEO DISPLAY PROJECTOR

[75] Inventors: Le Roy Francis Kepley, Jr., Dallas; William K. King, Carrollton; Michael G. Berry, Farmers Branch, all of Tex.

[73] Assignee: Technological Systems Sales, Inc., Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/709,311
[22] Filed: Sep. 9, 1996
[51] Int. Cl.$^6$ ............................. H04N 5/64; H04N 9/31
[52] U.S. Cl. ................. 348/744; 348/836; 348/787; 348/788; 348/789; 312/7.2
[58] Field of Search .................. 348/787–789, 348/836, 744; 312/7.2

[56] References Cited

U.S. PATENT DOCUMENTS

| | | | |
|---|---|---|---|
| 4,132,295 | 1/1979 | Hochfelsen | 190/60 |
| 4,202,015 | 5/1980 | Udo et al. | 348/782 |
| 4,323,926 | 4/1982 | Newman | 348/776 |
| 4,417,273 | 11/1983 | Kloss | 358/60 |
| 4,842,402 | 6/1989 | Wise | 353/74 |
| 5,137,450 | 8/1992 | Thomas | 434/44 |
| 5,276,524 | 1/1994 | Inoue et al. | 358/237 |
| 5,289,287 | 2/1994 | Dargis et al. | 348/766 |
| 5,293,244 | 3/1994 | Kawaguchi | 348/789 |
| 5,315,395 | 5/1994 | Nakao et al. | 348/789 |
| 5,404,182 | 4/1995 | Nomura | 348/836 |
| 5,433,670 | 7/1995 | Trumbull | 472/60 |
| 5,631,715 | 5/1997 | Kirkpatrick et al. | 348/839 |
| 5,640,215 | 6/1997 | Catta | 348/789 |
| 5,822,023 | 10/1998 | Suman et al. | 348/837 |
| 5,864,417 | 1/1999 | Ho | 359/201 |

*Primary Examiner*—John K. Peng
*Assistant Examiner*—Linus H. Lo
*Attorney, Agent, or Firm*—Gregory M. Howison; Mark W. Handley

[57] ABSTRACT

A video display is provided which includes a display screen mounted to a forward end of the video display, a video projector having a center of gravity, and a reflective assembly for directing light from within the video projector to the display screen. The video display further includes a frame for supporting the display screen, the video projector and a reflective assembly in an operative relationship. Stationary brackets are rigidly mounted to the frame, and projector brackets are rigidly mounted to the video projector. The projector brackets are pivotally mounted to the stationary brackets for rotating relative to the stationary brackets, about a pivot point. Rotating the projector brackets relative to the stationary brackets rotates the video projector relative to the frame, from a first position to a second position. When the video projector is rotated about the frame from the first position to the second position, the center of gravity of the video projector is moved from forward of the pivot point to rearward of the pivot point and a rearward end of the video projector is moved in a downward direction. The weight of the video projector is supported when it is disposed in the second position so that it will automatically remain in the second position for servicing.

16 Claims, 2 Drawing Sheets

U.S. Patent          Dec. 7, 1999          Sheet 1 of 2          5,999,232

PIVOTING MOUNT FOR A REAR PROJECTION VIDEO DISPLAY PROJECTOR

BACKGROUND OF THE INVENTION

Prior art video displays have been provided with video projectors. Such types include rear-projection types of video displays having a video display screen on a forward end, reflectively mirrored surfaces for directing a video beam from within the video display to the video display screen, and a video projector for providing the video beam. Such video projectors have included larger three-gun types of video projectors, each gun providing one of the basic colors.

Such video projectors are typically rigidly mounted to a supportive framework included within the video display. The framework is typically rigid, not allowing the video projectors to be easily moved without fully disassembling the video projector from the display unit. This often provides problems when the video projector is mounted close to one of the reflective surfaces from which the video signal is directed toward the video display screen. Some video projectors have forward ends which require servicing. For example, power supplies may be disposed in the lower, forward most end of the video projectors. When servicing is required, the video projector must be forcibly removed from within the video display so that the lower forward section of the video projector may be accessed for servicing. Such projectors often weigh as much as 150 pounds, and the weight, when combined with the size of the video projector, may cause injury to persons servicing the video projector.

One prior art apparatus for mounting a video projector within a video display has a swing-type of carriage. A U-shaped cradle is mounted at its upper end to vertical posts. The video projector is mounted to the U-shaped cradle beneath the pivot points such that when the video projector is moved either forward or rearward from a neutral, lowermost position, the center of gravity of the video projector tends to pull the video projector back to the neutral, lower position. If the video projector swings forward of the pivot point, the forward end of the video projector is elevated. If the video projector swings rearward of the pivot point, the rearward end of the video projector is elevated. This type of arrangement may often be dangerous because continuous force must be applied to prevent the video projector from returning to the neutral, downwardly disposed position into which it tends to return. Persons servicing the video projectors may be injured and the video projectors may be damaged if the cradle is released so that the heavy video projector swings back toward the neutral, lowermost position. Also, this still may not provide adequate room for servicing the video projector, requiring that the video projector be removed from its display mount for servicing.

SUMMARY OF THE INVENTION

The present invention disclosed and claimed herein comprises a video display which includes a display screen mounted to a forward end of the video display, a video projector having a center of gravity, and a reflective assembly for directing light from within the video projector to the display screen. The video display further includes a framework for supporting the display screen, the video projector and a reflective assembly in an operative relationship. Stationary brackets are rigidly mounted to the framework, and projector brackets are rigidly mounted to the video projector. The projector brackets are pivotally mounted to the stationary brackets for rotating relative to the stationary brackets, about a pivot point. Rotating the projector brackets relative to the stationary brackets rotates the video projector relative to the framework, from a first position, for operating the video projector, to a second position, for servicing the video projector. When the video projector is rotated about the framework from the first position to the second position, the center of gravity of the video projector is moved from forward of the pivot point to rearward of the pivot point and a rearward end of the video projector to moved downward. The weight of the video projector is supported when it is disposed in the second position so that it will automatically remain in the second position for servicing.

It is another aspect of the present invention that a rotation stop pin is mounted to one of the stationary brackets and the projector brackets for locating the video projector in the second position, and preventing further rotation thereof of the video projector beyond the second position.

It is yet another aspect of the present invention that an assembly stop is mounted to one of the stationary brackets to locate the stationary bracket, projector bracket and the video projector in a supported position disposed on top of the framework.

It is further another aspect of the present invention that the stationary brackets have forward portions which are parallel to one another, and rearward portions which are splayed outward to spread apart from one another to provide clearance for the video projector to pass therebetween.

It is yet another aspect of the present invention that the projector brackets have forward sections which are notched in the lower portions thereof for allowing rotation of the video projector into the first position.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
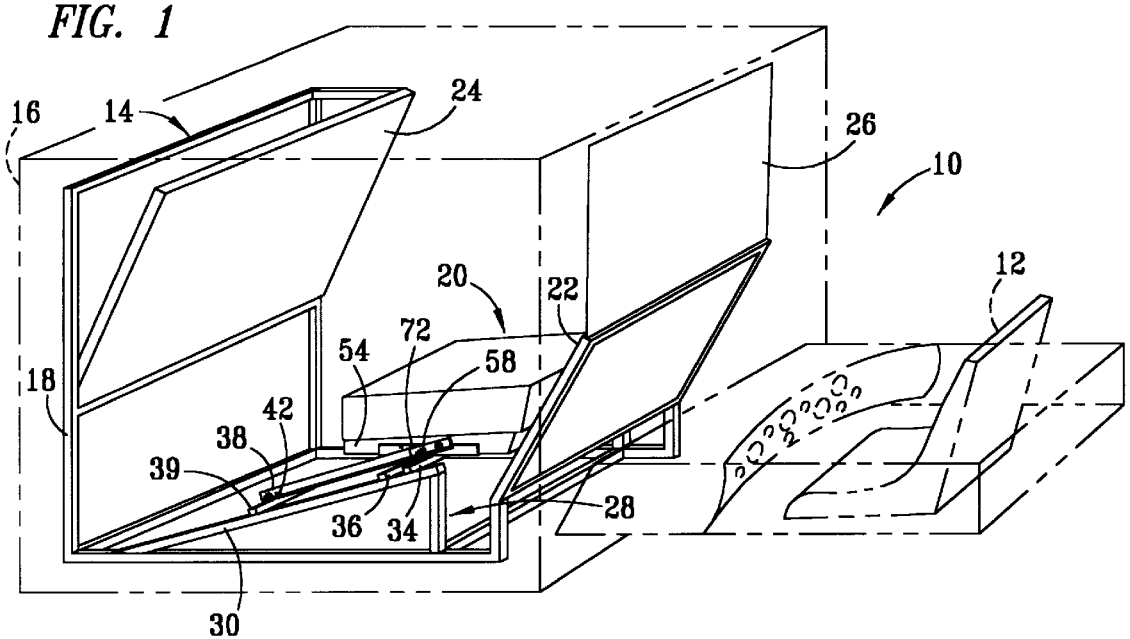
FIG. 1 illustrates a partial perspective view a video display of a flight training simulator made according to the present invention.

Referring now to FIG. 1, there is illustrated a partial, perspective view of a training simulator 10 made according to the present invention. The training simulator 10 includes a cockpit portion 12 of an F-16 Fighting Falcon fighter jet aircraft and a video display 14 for providing video displays of flight simulations. Video display 14 is preferably a rear projection type of video display.

The video display 14 includes a housing 16 (shown in phantom) having a framework 18. The video display 14 further includes a video projector 20, which preferably is an Electrohome brand, model Marque™ 8500 video projector. A forward reflective surface 22 is spaced approximately two inches in front of the three lenses of the video projector 20 for receiving a video beam of light emitted from the three lenses of the video projector 20 and reflecting the video beam rearward towards a rearward reflective surface 24. The rearward reflective surface 24 receives the video beam from forward reflective surface 22 and reflects it foreword for display on a display screen 26. Together, forward reflective surface 22 and rearward reflective surface 24 provide a reflective assembly. The reflective surfaces 22 and 24, and the display screen 26 are rigidly mounted to the frame 18 of the housing 16, which preferably is rigid. Reflective surfaces 22 and 24 are made of Mylar and are coated to have exteriorly disposed reflective surfaces.

A support base 28 is rigidly mounted to the framework 18, preferably by welding. The support base 28 comprises two spaced-apart, symmetrically disposed portions formed of square aluminum tubing. The first portion includes an inclined member 30 and the second portion includes an inclined member 32. Both of the inclined members 30 and 32 extend parallel to one another, and are inclined downward in a rearward direction, toward the rearward end of the video display 14. Cross members 34 and 36 extend between the spaced apart inclined members 30 and 32.

The stationary brackets 38 and 40 are rigidly mounted to the cross members 34 and 36, respectively, by bolts. The stationary brackets 38 and 40 are symmetrical to one another. The stationary bracket 38 includes an assembly stop 42 which extends downwardly therefrom for engaging a forward end of a laterally extending bar 39 of support base 28 so that stationary bracket 38 will not move rearward with respect to support base 28 as it is being secured thereto. The stationary bracket 40 also includes an assembly stop 44, which prevents the stationary bracket 40 from moving rearwardly with respect to the support base 28 as it is being bolted thereto by engaging a forward end of laterally extending bar 39.

Figure 2:
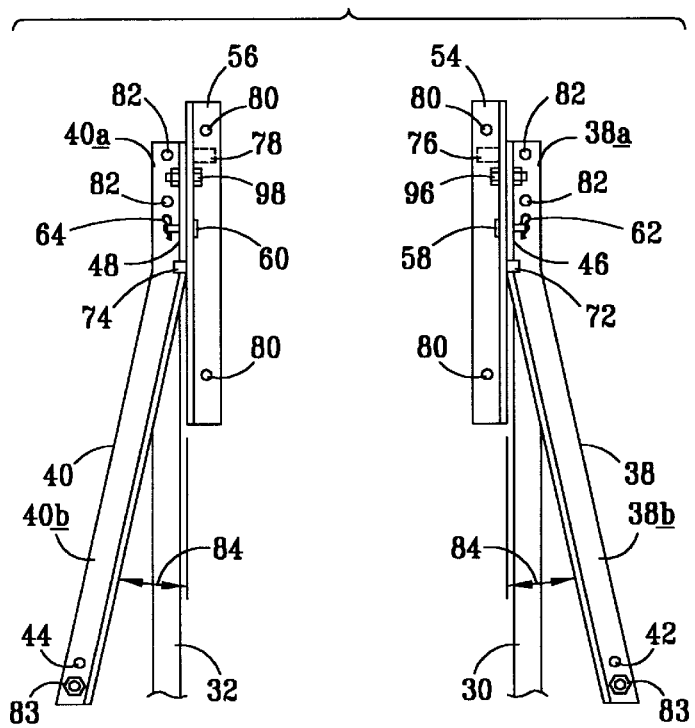
FIG. 2 illustrates a top view of a portion of a video projector mount made according to the present invention.

Referring now to FIG. 2, there is illustrated a top view of the inclined members 30 and 32, the stationary brackets 38 and 40, and the projector brackets 54 and 56. The stationary brackets 38 and 40 include apertures 46 and 48, respectively, for receiving respective ones of pivot pins 58 and 60. The stationary brackets 38 and 40 are formed from two-inch by two-inch steel angle iron, which is one-eighth inch thick.

Figure 3:
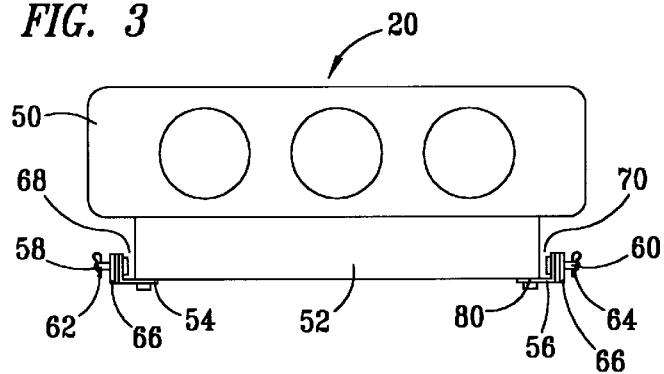
FIG. 3 illustrates a front elevational view of a forward end of a video projector mounted within the video display of FIG. 1.

Referring now to FIG. 3, there is illustrated a front, elevational view of the video projector 20 and the projector brackets 54 and 56. The video projector 20 includes an upper section 50, which houses the three video guns, or projector tubes. A lower section 52 of the video projector 20 houses electronics and power supplies for operating the video projector 20. The projector brackets 54 and 56 are mounted flush to the bottom of the lower section 52 of the video projector 20. In the preferred embodiment, the projector brackets 54 and 56 are mounted beneath the lowermost portion of the video projector 20.

Preferably, the projector brackets 54 and 56 are provided by two-inch steel angle iron, which is one-eighth inch thick. The upwardly extending, vertical flanges of the two-inch angle iron of which the projector brackets 54 and 56 are made are spaced apart from the sides of the lower section 52 of the video projector 20 by gaps 68 and 70, respectively. The gaps 68 and 70 are provided so that air flow will not be restricted around the side walls of the lower section 52 of the video projector 20 to provide adequate cooling for the power supplies and the electronics disposed within the lower section 52. The laterally extending flanges of the angle iron of which the projector brackets 54 and 56 are preferably mounted flush against the lowermost bottom surface of the video projector 20.

The projector bracket 54 includes a pivot pin 58 which extends laterally through and to the side of the upwardly extending vertical flange of the angle iron from which the projector bracket 54 is made. The projector bracket 56 has a pivot pin 60 mounted thereto which extends laterally aside of the upwardly extending vertical flange of the angle iron from which the projector bracket 56 is made. The pivot pins 58 and 60 are tack-welded to the projector brackets 54 and 56, respectively. The projector brackets 54 and 56 are pivotally mounted to the stationary brackets 38 and 40, respectively, by respective ones of the pivot pins 58 and 60. The pivot pins 58 and 60 define pivot points about which the projector brackets 54 and 56 rotate relative to stationary brackets 38 and 40, respectively. The stationary brackets 38 and 40 and the projector brackets 54 and 56 are symmetrical about a center line of the video display 14 which extends from the forward end to the rearward end of the video display 14.

Cotter pins 62 and 64 extend through apertures in the outward ends of the pivot pins 58 and 60 to provide removable lock members for pivot pins 58 and 60, respectively. Four washers 66 are mounted to the pivot pins 58 and 60, two washers on each of the pins 58 and 60, to provide bearing surfaces between the upwardly extending vertical flanges of the projector brackets 54 and 60 and the upwardly extending vertical flanges of the stationary brackets 38 and 40.

Referring again to FIG. 2, the projector brackets 54 and 56 have rearward rotation stops 72 and 74, respectively. The rotation stops 72 and 74 are tack-welded to respective ones of the upwardly extending vertical flanges of the angle iron of which projector brackets 54 and 56 are made. The rotation stops 72 and 74 extend laterally outward from respective ones of the projector brackets 54 and 56 for engaging the stationary brackets 38 and 40, respectively, to provide stops for limiting rotation of the projector brackets 54 and 56 relative to the stationary brackets 38 and 40, respectively, in a counterclockwise direction as viewed in FIG. 1.

Optionally, the projector brackets 54 and 56 may have notches 76 and 78, respectively, formed therein. The notches 76 and 78 may be provided to extend upward into the lowermost portions of the projector brackets 54 and 56 to determine the extent of angular rotation between the projector brackets 54 and 56 and the stationary brackets 38 and 40, respectively, in a clockwise direction as viewed in FIG. 1. However, in a preferred embodiment, the notches 76 and 78 are preferably not provided in the projector brackets 54 and 56. Forward stops for limiting angular displacement of the projector brackets 54 and 56 in a forward, clockwise direction, as viewed in FIG. 1, are provided by cross member 34. The lowermost sides of the projector brackets 54 and 56 rest against the cross member 34 when the video projector 20 is forwardly disposed into the operating position.

Figure 4:
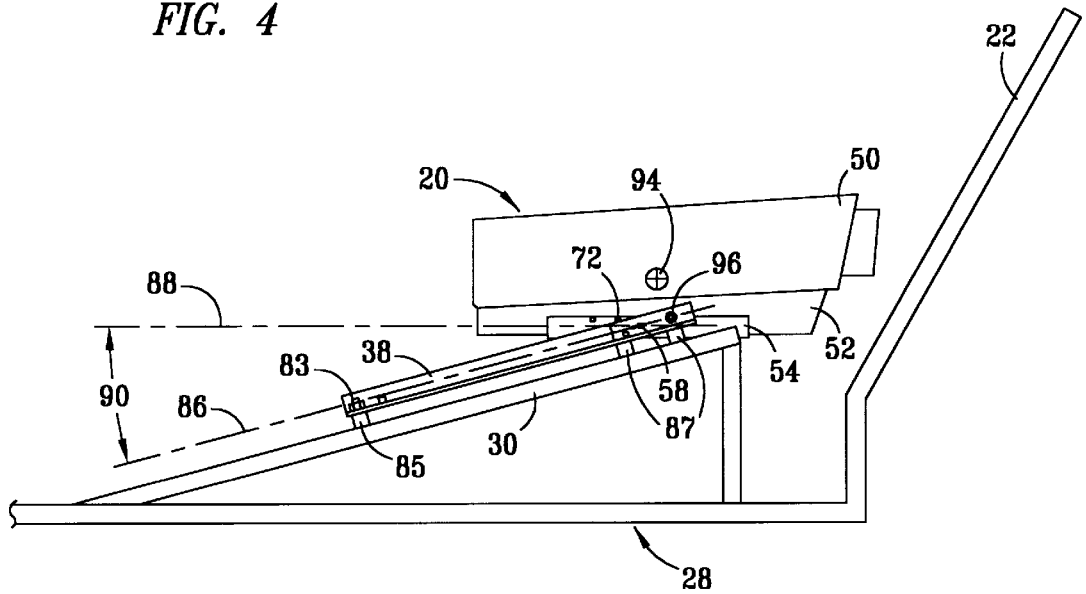
FIG. 4 illustrates a side elevational view of the video projector and the video projector mount of the present invention, disposed in a first position for operating the video projector.
Figure 5:
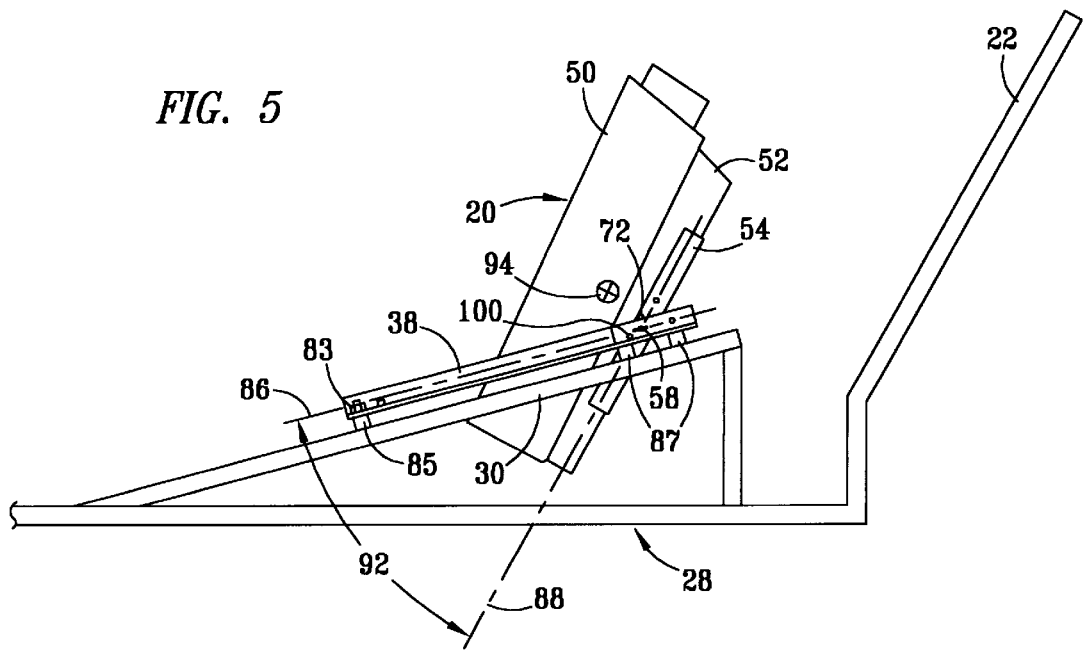
FIG. 5 illustrates a side elevational view of the video projector and the video projector mount of the present invention, with the video projector rearwardly disposed in a second position for servicing the video projector.

Referring to FIGS. 2, 4, and 5, mounting holes 80 are provided in projector brackets 54 and 56 for bolting the projector brackets 54 and 56 to the bottom of the lower section 52 of the video projector 20. Mounting holes 82 are provided in stationary brackets 38 and 40 for bolting forward ends 38a and 40a of the stationary brackets 38 and 40 to the support base 28 to rigidly secure the stationary brackets 38 and 40 to the support base 28. The rearward ends 38b and 40b have adjustable feet 85 (one shown) which are mounted to nuts 83. The rearward ends 38b and 40b (one shown) have a threaded rod which extends upwards and threadingly engages the nuts 83. The nuts 83 are welded to the rearward ends 38b and 40b of stationary members 38 and 40, respectively.

Referring again to FIG. 2, the stationary bracket 38 includes the forward portion 38a and the rearward portion 38b. The stationary bracket 40 includes the forward portion 40a and the rearward portion 40b. The forward portions 38a and 40a are parallel, and the rearward portions 38b and 40b of the stationary brackets 38 and 40, respectively, are angled in the plane of inclined members 30 and 32 to extend laterally outward from one another, such that the rearward portions 38b and 40b are splayed outward in a rearwardly direction. The forward portion 38a of stationary bracket 38 extends parallel to the projector bracket 54. The rearward portion 38b of the stationary bracket 38 extends rearward from the forward portion 38a and the projector bracket 54 at an angle 84 of 12½ degrees. The forward portion 40a of the stationary bracket 40 extends parallel to the projector bracket 56, and the rearward portion 40b of the stationary bracket 40b extends rearward from the forward portion 40a and the projector bracket 56 at an angle 84 of 12½ degrees.

Referring now to FIG. 4, there is illustrated a side, elevational view of the support base 28, the stationary bracket 38, the projector bracket 54 and the video projector 20, with the projector bracket 54 and the video projector 20 disposed in forward positions. The forward most end of the video projector 20 is approximately two inches from the reflective surface 22. The forward end of the stationary bracket 38 has a longitudinal center line 86. The projector bracket 54 has a longitudinal center line 88. When the projector bracket 54 is disposed in the forward position, rotated counterclockwise about pivot the point 58, an angle 90 will extend between the center line 86 and the center line 88. Lock bolts 96 and 98 (one shown) are provided for engaging the two upwardly extending flanges of the stationary brackets 38 and 40 (one shown), and the projector brackets 54 and 56 (one shown), respectively, to prevent rotation of projector brackets 54 and 56 about the stationary brackets 38 and 40.

Referring now to FIG. 5, there is illustrated a side, elevational view of the support base 28, the stationary bracket 38, the projector bracket 54 and the video projector 20, with the projector bracket 54 and the video projector rotated counterclockwise to a rearward position. The projector bracket 56 has been rotated counterclockwise from the forward, first position illustrated in FIG. 4 to the rearward, second position illustrated in FIG. 5. An angle 92 extends between the center lines 86 and 88. This raises the forward end of the video projector 20 upwards so that it may be accessed for servicing the lower portion 52 and the lenses of the video projector 20, providing a greater distance between the reflective surface 22 and the forward most end of the video projector 20. The rearward end of the video projector 20 is moved downward in elevation with respect to the forward end of the video projector 20 when the video projector 20 is moved from the forward to the rearward positions.

Operation to install and then service the video projector 20 of the video display 14 is now described. The video display 14 is provided having a support base 28 with the parallel inclined members 30 and 32. The projector brackets 54 and 56 are mounted to the lowermost end of the lower portion of the video projector 20 by four bolts, two of the four bolts passing through respective ones of the laterally extending flanges of the projector brackets 54 and 56. The projector brackets 54 and 56 are preferably aligned to be parallel.

Then, the stationary brackets 38 and 40 are pivotally mounted to the projector brackets 54 and 56, respectively, by the pivot pins 58 and 60 engaging within the respective ones of the apertures 46 and 48. The apertures 46 and 48 provide bearing surfaces in which pivot the pins 58 and 60 engage the stationary brackets 38 and 40. The cotter pins 62 and 64 are passed through the apertures in the ends of the pivot pins 58 and 60 to latch the stationary brackets 38 and 40 to respective ones of the pivot pins 58 and 60 of the projector brackets 54 and 56. The lock bolts 96 and 98 are then inserted to extend through the vertically extending flanges of respective ones of the stationary brackets 38 and 40 and the projector brackets 54 and 56 to rigidly secure the stationary bracket 38 with respect to the projector bracket 54 and to rigidly secure the stationary bracket 40 with respect to the projector bracket 56. With the lock pins 96 and 98 installed, the projector brackets 54 and 56 will not rotate relative to respective ones of the stationary brackets 38 and 40.

Once the video projector 20 is rigidly secured to the projector brackets 54 and 56 and the stationary brackets 38 and 40, it will be mounted to the support base 28 of the framework 18. The entire assembly comprising the video projector 20, the projector brackets 54 and 56, and the stationary brackets 38 and 40 are placed on top of support base 28, with the assembly stops 42 and 44 extending downward from respective ones of the stationary brackets 38 and 40 to engage a rearward end portion of the support base 28. The engagement of the assembly stops 42 and 44 with the support base 28 prevents the stationary brackets 38 and 40, with the video projector 20, from sliding downward on the inclined members 30 and 32 under the weight of the video projector 20. The Assembly stops 42 and 44 are preferably provided by either pins or bolts which are welded to and extend downward through holes in to the laterally extending, inclined flanges of the support brackets 38 and 40.

The stationary brackets 38 and 40 are then rigidly secured to the support base 28 by two bolts, which extend through the mounting holes 82 in the stationary brackets 38 and 40. The mounting bolts are preferably rigidly secured to the cross members 34 and 36 by being bolted to four stand-offs 87 (two shown) of the cross members 34 and 36 of the support base 28. The four stand-offs 87 (two shown) are rigidly secured to the cross members 34 and 36 by welding. Preferably, the video projector 20 is secured to the support base 28 as shown in FIGS. 1 and 4, so that the video projector 20 will be operatively aligned within the video display 14 for emitting a video beam of light which is reflected from the reflective surface 22, to the reflective surface 24 and then to the display screen 26 to display video pictures which simulate scenes viewed during flight of a jet aircraft.

Later, when the video projector 20 requires servicing, the lock bolts 96 and 98 may be removed from rigidly securing the projector bracket 54 to the stationary bracket 38 and from rigidly securing the projector bracket 56 to the stationary bracket 40 so that the projector brackets 54 and 56 can rotate relative to the stationary brackets 38 and 40, respectively. The video projector 20 is then rotated from the forward position shown in FIG. 4, in a counterclockwise direction as viewed in FIG. 4 and 5, to a rearward position shown in FIG. 5. This allows a service technician to access the lenses on the forward end of the video projector 20, and to access the electronics and power supplies within the lower section 52.

As the video projector is moved from the position shown in FIG. 4 to the position shown in FIG. 5, a center of gravity 94 of the video projector 20 is moved from a position forward of the pivot pins 58 and 60 to a position which is rearward of the pivot pins 58 and 60. That is, the center of gravity 94 is moved above and over an axis of rotation of the video projector 20, which extends through the pivot pins 58 and 60 to define the pivot points of the pins 58 and 60. When the video projector 20 is rotated to the forward position shown in FIG. 4, the center of gravity holds the video projector 20 in place relative to the reflective surface 22 and the support base 28, with the forward weight of the video projector 20 resting on a forward end of the support base 28.

When the video projector 20 is rotated counterclockwise about the pivot pins 58 and 60 to the rearward position shown in FIG. 5, the center of gravity 94 moves rearward of the pivot pins 58 and 60, and the rotation stops 72 and 74 engage the uppermost portion of the upwardly extending vertical flange portions of the support brackets 38 and 40 to prevent further rotation of the video projector 20 in a counterclockwise direction. The rearward end of the video projector 20 is moved downward. With the center of gravity 94 of the video projector 20 disposed rearward of the pivot pins 58 and 60 in the rearwardly disposed second position, the rearwardly disposed weight of the video projector 20 will be supported by the rotation stop pins 72 and 74. The video projector 20 will remain in a counterclockwise, rotated position, supported by the rotation stops 72 and 74.

Optionally, a rearward lock pin 100 may be provided to prevent the video projector 20 from being rotated in a forward direction while it is being serviced. More than the one rearward lock pin 100 may be used to lock the video display 20 into the rearwardly rotated servicing position. Preferably, the lock pin 100 will extend through and secure one of the stationary brackets 38 and 40 to one of the projector brackets 54 and 56.

After servicing, the lock pin 100, if any are used, will be removed from securing the video projector 20 in the rearward position. Then the projector brackets 54 and 56 and the video projector 20 will be rotated in a clockwise direction, as viewed in FIGS. 4 and 5, relative to the stationary brackets 38 and 40 and the support base 28 to move the video projector 20 back into the forward position. In the forward position, the forward end of the video projector 20 is closely spaced to the reflective surface 22, as shown in FIG. 4. The lock bolts 96 and 98 will then be replaced to extend between respective ones of the stationary brackets 38 and the projector brackets 54 and 56. This will lock the video projector in place in operative relation to the reflective surfaces 22 and 24, and the display screen 26 for further display of video pictures.

The present invention provides several advantages over prior art video displays. A video projector mounted according to the present invention may be serviced without disassembly from the video display. The video projector may be rotated from a forward to a rearward position to allow access to a forward portion of the video projector for servicing, with the video projector automatically remaining in the rearward position. Lock pins are provided for securing the video projector in either of the forward or rearward positions. Additionally, the present invention may be utilized for retrofitting prior art video displays to allow use of previously constructed components of video displays with various types of video projectors, such as the Electrohome Marque™ 8500 video projector.

Although the preferred embodiment has been described in detail, it should be understood that various changes, substitutions and alterations can be made therein without departing from the spirit and scope of the invention as defined by the appended claims.

What is claimed is:

1. A video display, comprising:

a rearward projection display screen;

a video projector having a center of gravity, a forward end and a rearward end;

a reflective assembly for directing light from said video projector to said display screen;

a frame for supporting said display screen, said video projector and said reflective assembly in an operative relationship;

a stationary bracket rigidly mounted to said frame;

a projector bracket rigidly mounted to said video projector;

said projector bracket being pivotally mounted to said stationary bracket at a pivot point which is fixed in a single, stationary position relative to said stationary bracket, such that said projector bracket and said video projector are rotatable for angularly displacing about said pivot point and relative to said stationary bracket and said frame;

wherein said video projector is rotatable relative to said pivot point, from a first position to a second position, to both move said center of gravity of said video projector from being disposed forward of said pivot point in said first position, to being disposed rearward of said pivot point in said rearward position, and to move said rearward end of said video projector downward in elevation with respect to said forward end of said video projector and a rotation stop rigidly mounted to said projector bracket and extending laterally therefrom for engaging said stationary bracket when said video projector is disposed in said second position, and supporting a rearward portion of the weight of said video projector.

2. A video display, comprising:

a rearward projection display screen;

a video projector having a center of gravity, a forward end and a rearward end;

a reflective assembly for directing light from said video projector to said display screen;

a frame for supporting said display screen, said video projector and said reflective assembly in an operative relationship;

a stationary bracket rigidly mounted to said frame;

a projector bracket rigidly mounted to said video projector;

said projector bracket being pivotally mounted to said stationary bracket at a pivot point which is fixed in a single, stationary position relative to said stationary bracket, such that said projector bracket and said video projector are rotatable for angularly displacing about said pivot point and relative to said stationary bracket and said frame;

wherein said video projector is rotatable relative to said pivot point, from a first position to a second position, to both move said center of gravity of said video projector from being disposed forward of said pivot point in said first position, to being disposed rearward of said pivot point in said rearward position, and to move said rearward end of said video projector downward in elevation with respect to said forward end of said video projector; and an assembly stop extending downward from said stationary bracket for engaging said frame to supportingly locate said projector bracket when said video projector, said projector bracket and said stationary bracket are being secured to said frame.

3. The video display according to claim 1, wherein said stationary bracket has a rearward section and a forward section, and said rearward section is disposed at an angle to said forward section for providing clearance for said video projector in moving from said first position to said second position.

4. The video display according to claim 1, further comprising:
   a pivot pin which extends between said projector bracket and said stationary bracket for pivotally mounting said projector bracket to said stationary bracket and defining said pivot point.

5. The video display according to claim 1, wherein said center of gravity is disposed at an elevation which remains above said pivot point when said video projector is moved from said first position to said second position, and therebetween.

6. A video display, comprising:
   a rearward projection screen mounted to a forward side of said video display;
   a video projector having a center of gravity, a forward end and a rearward end;
   a reflective assembly for directing light emitted from said video projector to said display screen;
   a frame for supporting said display screen, said video projector and said reflective assembly in an operative relationship;
   two spaced apart stationary brackets rigidly mounted to said frame;
   two projector brackets rigidly mounted to a lower portion of said video projector in a spaced apart relation;
   two pivot pins extending between respective ones of said projector brackets and said two spaced apart stationary brackets, and pivotally mounting said projector brackets to respective ones of said two spaced apart stationary brackets at two pivot points which are fixed at respective, single, stationary positions relative to respective ones of said two spaced apart stationary brackets;
   wherein said two pivot pins are disposed for rotating said video projector relative to said frame, from a first position in which said center of gravity of said video projector is disposed forward of said pivot pins to a second position in which said center of gravity is disposed rearward of said pivot pins and said rearward end of said video projector is moved downward in elevation in relation to said forward end of said video projector; and
   a rotation stop rigidly mounted to one of said projector brackets, and extending laterally therefrom for engaging a respective one of said stationary brackets when said video projector is disposed in said second position.

7. A video display comprising:
   a rearward projection screen mounted to a forward side of said video display;
   a video projector having a center of gravity, a forward end and a rearward end;
   a reflective assembly for directing light emitted from said video projector to said display screen;
   a frame for supporting said display screen, said video projector and said reflective assembly in an operative relationship;
   two spaced apart stationary brackets rigidly mounted to said frame;
   two projector brackets rigidly mounted to a lower portion of said video projector in a spaced apart relation;
   two pivot pins extending between respective ones of said projector brackets and said two spaced apart stationary brackets, and pivotally mounting said projector brackets to respective ones of said two spaced apart stationary brackets at two pivot points which are fixed at respective, single, stationary positions relative to respective ones of said two spaced apart stationary brackets;
   wherein said two pivot pins are disposed for rotating said video projector relative to said frame, from a first position in which said center of gravity of said video projector is disposed forward of said pivot pins to a second position in which said center of gravity is disposed rearward of said pivot pins and said rearward end of said video projector is moved downward in elevation in relation to said forward end of said video projector; and
   an assembly stop extending downward from one of said stationary brackets for engaging said frame to supportingly locate said stationary bracket when said stationary bracket is being mounted to said frame.

8. A video display, comprising:
   a rearward projection screen mounted to a forward side of said video display;
   a video projector having a center of gravity, a forward end and a rearward end;
   a reflective assembly for directing light emitted from said video projector to said display screen;
   a frame for supporting said display screen, said video projector and said reflective assembly in an operative relationship;
   two spaced apart stationary brackets rapidly mounted to said frame;
   two projector brackets rigidly mounted to a lower portion of said video projector in a spaced apart relation;
   two pivot pins extending between respective ones of said projector brackets and said two spaced apart stationary brackets, and pivotally mounting said projector brackets to respective ones of said two spaced apart stationary brackets at two pivot points which are fixed at respective, single, stationary positions relative to respective ones of said two spaced apart stationary brackets;
   wherein said two pivot pins are disposed for rotating said video projector relative to said frame, from a first position in which said center of gravity of said video projector is disposed forward of said pivot pins to a second position in which said center of gravity is disposed rearward of said pivot pins and said rearward end of said video projector is moved downward in elevation in relation to said forward end of said video projector; and
   wherein said two spaced apart stationary brackets have forward portions which extend parallel to one another and rearward portions which are splayed laterally outward to extend away from the one another in a rearward direction, at corresponding acute angles to respective ones of said forward portions.

9. A video display, comprising:
   a rearward projection screen mounted to a forward side of said video display;

a video projector having a center of gravity, a forward end and a rearward end;

a reflective assembly for directing light emitted from said video projector to said display screen;

a frame for supporting said display screen, said video projector and said reflective assembly in an operative relationship;

two spaced apart stationary brackets rigidly mounted to said frame;

two projector brackets rigidly mounted to a lower portion of said video projector in a spaced apart relation;

two pivot pins extending between respective ones of said projector brackets and said two spaced apart stationary brackets, and pivotally mounting said projector brackets to respective ones of said two spaced apart stationary brackets at two pivot points which are fixed at respective, single, stationary positions relative to respective ones of said two spaced apart stationary brackets;

wherein said two pivot pins are disposed for rotating said video projector relative to said frame, from a first position in which said center of gravity of said video projector is disposed forward of said pivot pins to a second position in which said center of gravity is disposed rearward of said pivot pins and said rearward end of said video projector is moved downward in elevation in relation to said forward end of said video projector; and wherein said two projector brackets each have a forward, lower facing section which are notched for receiving therein an upward portion of said frame to allow said video projector to pivot into said first position.

10. A video display, comprising:

a rearward projection screen mounted to a forward side of said video display;

a video projector having a center of gravity, a forward end and a rearward end;

a reflective assembly for directing light emitted from said video projector to said display screen;

a frame for supporting said display screen, said video projector and said reflective assembly in an operative relationship;

two spaced apart stationary brackets rigidly mounted to said frame;

two projector brackets rigidly mounted to a lower portion of said video projector in a spaced apart relation;

two pivot pins extending between respective ones of said projector brackets and said two spaced apart stationary brackets, and pivotally mounting said projector brackets to respective ones of said two spaced apart stationary brackets at two pivot points which are fixed at respective, single, stationary positions relative to respective ones of said two spaced apart stationary brackets;

wherein said two pivot pins are disposed for rotating said video projector relative to said frame, from a first position in which said center of gravity of said video projector is disposed forward of said pivot pins to a second position in which said center of gravity is disposed rearward of said pivot pins and said rearward end of said video projector is moved downward in elevation in relation to said forward end of said video projector; and wherein one of said two projector brackets and one of said two spaced apart stationary brackets each include apertures, which are disposed for aligning relative to one another and receiving a lock pin therebetween to latch said video projector into said first position.

11. The video display according to claim 6, further comprising:

an assembly stop extending downward from one of said stationary brackets for engaging said frame to supportingly locate said video projector relative to said frame and said reflective assembly.

12. The video display according to claim 6, further comprising:

an assembly stop extending downward from one of said stationary brackets for engaging said frame to supportingly locate said stationary brackets and said video projector when said stationary brackets are being secured to said frame;

wherein said stationary brackets have forward portions which extend parallel to one another and rearward portions which are splayed laterally outward and away from one another in a rearward direction, at corresponding acute angles to respective ones of said forward portions;

wherein said projector brackets each have forward, lower facing sections which are notched for receiving therein an upward portion of said frame to allow said video projector to pivot into said first position; and wherein one of said projector brackets and one of said stationary brackets each include apertures, wherein said apertures are disposed for being aligned adjacent to one another for receiving a lock member therebetween to latch said video projector in said first position.

13. A method for servicing a video projector within a rearward projection video display having a rearward projection screen, the video projector, a reflective assembly for directing light from the video projector to the display screen, and a frame for supporting the display screen, the video projector and the reflective assembly in an operative relationship, wherein the video projector includes a center of gravity, a forward end and a rearward end, the method comprising the steps of:

rigidly mounting the video projector to projector brackets;

pivotally mounting the projector brackets and the video projector to stationary brackets, such that the projector brackets are rotatable about respective ones of two fixed, stationary pivot points, which are fixed at respective, single, stationary positions relative to the stationary brackets;

rigidly mounting the stationary brackets to the frame, with the video projector pivotally mounted to the stationary brackets for rotating about a pivot point and relative to the frame, with the video projector disposed in a first position, aligned in an operative relation to the reflective assembly and the display screen for displaying video images on the display screen;

rotating the video projector angularly around the two fixed, stationary pivot points, from the first position to a second position, wherein the center of gravity of the video projector moves from being disposed forward of the pivot point to being disposed rearward of the pivot point and the rearward end of the video projector moves downward in relation to the forward end of the video projector;

opening a forwardly disposed lower portion of the video projector for performing service therein;

providing the projector brackets with a laterally extending rotation stop for extending from the projector bracket and engaging one of the stationary brackets when the video projector is disposed in the second position; and engaging the rotation stop against the one of the stationary brackets when the video projector is disposed in the second position to prevent further rotation of the video projector and to prevent further movement of the rear of the video projector downwards.

14. The method according to claim 5, further comprising the steps of:

providing the stationary brackets with an assembly stop which extends from a rearward portion thereof for engaging the frame;

prior to mounting the video projector to the frame, mounting the video projector and the projector brackets to the stationary brackets; and then mounting the video projector to the frame, and engaging the frame with the assembly stop to retain the stationary brackets, the projector brackets and the video projector on top of frame as the stationary bracket is being secured to the frame.

15. The video display according to claim 8, wherein said acute angles are each equal to approximately twelve and one-half degrees.

16. The video display according to claim 12, wherein said acute angles are each equal to approximately twelve and one-half degrees.

* * * * *